E. E. GOLD.
STEAM HOSE.
APPLICATION FILED JAN. 13, 1911.
1,015,311.
Patented Jan. 23, 1912.
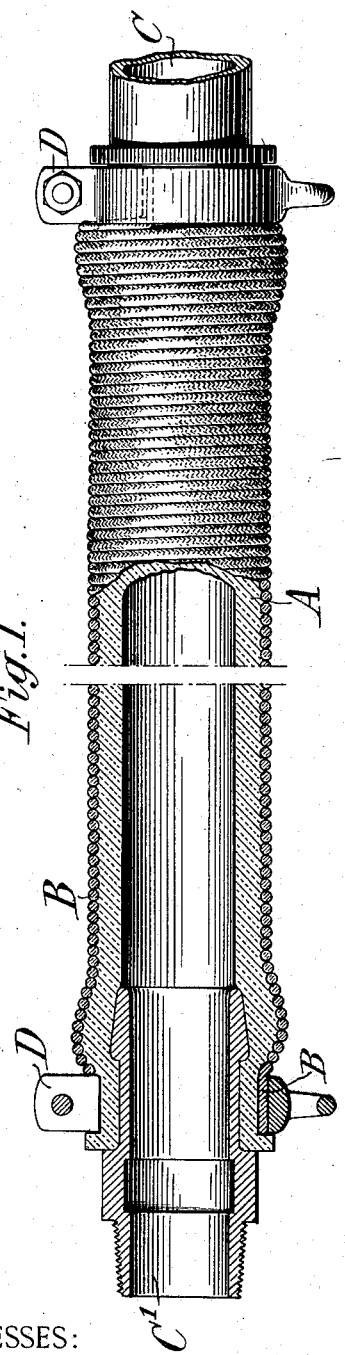
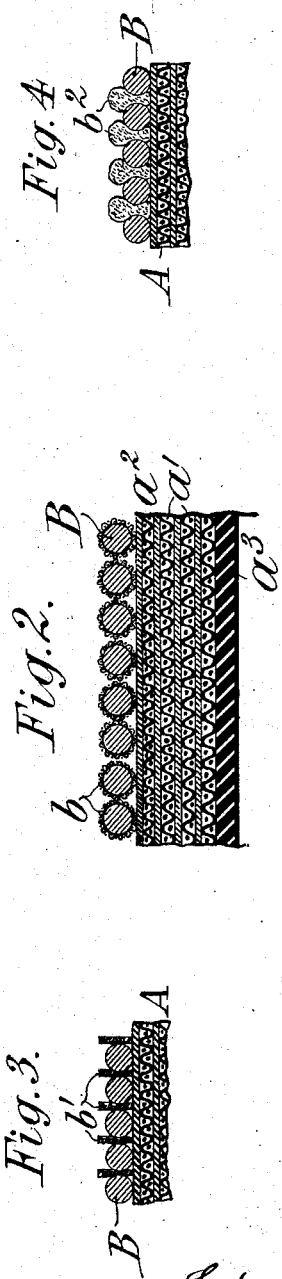
WITNESSES:
INVENTOR:
Edward E. Gold,
By Attorneys,

UNITED STATES PATENT OFFICE.

EDWARD E. GOLD, OF NEW YORK, N. Y.

STEAM-HOSE.

1,015,311.  Specification of Letters Patent.  Patented Jan. 23, 1912.

Application filed January 13, 1911. Serial No. 602,376.

*To all whom it may concern:*

Be it known that I, EDWARD E. GOLD, a citizen of the United States, residing in the borough of Manhattan, city, county, and State of New York, have invented certain new and useful Improvements in Steam-Hose, of which the following is a specification.

My invention relates to a flexible steam hose, and is particularly adapted for use in connection with such hose when employed to connect steam pipes employed for heating railway trains.

The object of my invention is to strengthen the construction of such hose and increase its life without impairing its flexibility.

In carrying these objects into effect, I have provided the hose with a reinforcement consisting preferably of metallic wires so disposed that adjacent wires shall lie near together, and interposing between such wires compressible material which will permit the hose to retain its flexible character.

In the application of reinforcing wires to steam hose, particularly to such hose when used upon heating pipes of railway trains, if the wire is laid so that adjacent coils are substantially in contact, the hose is so rigid that its usefulness is substantially destroyed. If, however, such wire is coiled so that a space between adjacent coils is left to permit the hose to easily bend, the pressure of the steam within the hose, combined with its heat, has the effect of expanding the rubber lining and the strengthening fabric usually employed in such hose, between the coils, and this operation being constantly repeated, rapidly destroys the hose. To overcome this objection, hose of great thickness has been employed for such purpose, to-wit, as heavy as eight-ply. This is very expensive to produce and does not fully accomplish the desired object.

My improved hose possesses all the strength which may be required and which is imparted to it by the reinforcing wire, and in addition, the compressible material interposed between the wires will, owing to its compressible nature, permit the hose to be sufficiently flexed for all necessary purposes.

A desirable form in which my invention may be embodied is illustrated in the accompanying drawing, where—

Figure 1 represents a plan view partly in section of a steam hose to which my invention has been applied. Fig. 2 is a fragmentary longitudinal section thereof, and Figs. 3 and 4 are similar views of modified forms.

In the preferred form of my invention the reinforcing wire is inclosed in a covering preferably of textile material, such as cotton thread or cord, braided or wound thereon to a suitable thickness, which may be wound two-ply, three-ply, or more, as may be required for the size of wire and of hose. For the ordinary steam hose I believe three-ply would be sufficient. This covering of the wire may well be then treated so that it shall be waterproof, and any one of many well-known methods may be employed for this purpose. The covered wire is then wound about the outside of the hose so that it shall fit snug thereon and that adjacent coils shall lie close together and with their fabric covering substantially in contact. The hose reinforced by this covering will be found to possess sufficient flexibility for the purpose, and the closely wound wire will effectually strengthen the hose and prevent any expansion of the hose between adjacent coils.

The fabric covering of the wire not only provides compressible material to permit a slight degree of movement of the wires relative to each other, but also covers the wire so that when the hose is filled with steam it may be handled without burning the fingers.

In the drawings I have illustrated in Fig. 1 a section of steam hose fitted with my preferred form of reinforcement, and in Fig. 2 a detailed longitudinal section of the hose with the said reinforcement in place. The steam hose A, as here illustrated, is of usual construction, comprising layers of fabric $a^1$, united by layers of rubber cement $a^2$ and lined on its interior with a tube $a^3$ of rubber. The construction, however, of such hose is immaterial for the purpose of my invention.

Upon the exterior of the hose my reinforcement is provided which here consists of a wire B inclosed in a fabric covering $b$, which may be woven, braided or wound thereon, or applied in any suitable manner. The said wire, as illustrated, is wound helically upon the steam hose A fitting snugly thereon and having adjacent coils substantially in contact as is represented in Fig. 2.

The ends of the hose are illustrated as mounted upon fittings C C' which may serve for attachment to the train pipe and coupler if the hose is used upon a railway train to connect the steam pipes. Bands D are provided to attach the hose to the fittings, and such bands are of usual construction, with ears and screw bolts to tighten the hose upon the fittings. The ends of the wire B are illustrated as being secured and held in position by being passed under the bands D.

I prefer to waterproof the textile covering $b$ of the wires B so that the same may assist in excluding moisture from hose A, thereby increasing the life of the said hose as well as the life of the said covering $b$.

If the wires B were coiled about the hose A with adjacent convolutions in contact without the covering $b$, it will be apparent that the resulting structure would be rigid. By the interposition, however, of the compressible material $b$ I have provided a construction whereon adjacent convolutions, even if wound closely together, may approach each other to a slight extent, and this slight movement will be found sufficient to permit the reinforced hose to be readily flexed. Where such flexing occurs the tendency will be on the inner side of the bent hose to crowd the compressible material $b$ together and more completely fill the slight space between the inner sides of the adjacent convolutions. On the opposite or outer side of the bend the said compressible material $b$, being closely wound, will be permitted to expand and it will be found that the hose is not deprived of the reinforcement of the wire to a sufficient extent to permit a destructive expansion and contraction of the hose between the adjacent convolutions.

The compressible material which is interposed between the coils of the wire is not necessarily present in the form of a jacket or cover for the said wire. It may take the form of a thin ribbon of a suitable compressible material such as rubber fabric, paper, or paper board, which if not waterproof in its nature, may be treated to make it so and may be interposed between the adjacent coils of the reinforcing wire. In Fig. 3 such ribbon or strip is designated $b^1$ and may, if desired, extend a small distance above wires B to provide a protection for the hand in holding the hose. The compressible material may also take the form of a woven, braided, or twisted cord or line, such as $b^2$ in Fig. 4. This may be made of soft material, if desired, such as marlin, cotton cord, hemp, etc., treated, if desired, to make it waterproof and laid between the convolutions of the wire B, the outer side of which may be raised sufficiently above the surface B to serve as a protection, if desired.

In the form shown in Figs. 3 and 4 the wires B will be laid as closely together as possible so that the compressible material $b^1$ or $b^2$ shall be tightly compressed and thereby permit the adjacent convolutions of the wire B to approach each other closely enough to furnish the needed support for the hose.

Although I have described with great particularity the details of my invention, it is not to be inferred that I regard the same as limited in all respects as to such details mentioned, as additions may be made to the invention, such as the employment of additional plies exterior to wires B, or equivalent devices may be used such as are within the limits of the appended claims.

What I claim is:

1. In a steam hose, a flexible body portion and an outer reinforcing covering therefor of wire, the adjacent coils of which lie close together and a packing of compressible material between adjacent coils.

2. In a steam hose, a flexible body portion and an outer reinforcing covering therefor of helically coiled wire fitting snugly thereto, the adjacent coils of which lie close together and a packing of compressible material between adjacent coils.

3. In a steam hose, a flexible body portion and an outer reinforcing covering therefor of wire inclosed in compressible material, said wire coiled on said flexible body portion so that adjacent coils are close together.

4. In a steam hose, a flexible body portion and an outer reinforcing covering therefor of helically wound wire covered with compressible material, the adjacent coils of wire lying close together.

5. In a steam hose, a flexible body portion and an outer reinforcing covering therefor of wire, the adjacent coils of which lie close together and a covering for said wire of textile material inclosing same.

6. In a steam hose, a flexible body portion and an outer reinforcing covering therefor of wire wound snugly thereon, the adjacent coils of wire lying close together and a covering for said wire of textile material.

7. In a steam hose, a flexible body portion and an outer reinforcing covering therefor of wire, adjacent coils lying close together, and each coil having a covering of waterproof compressible material.

8. In a steam hose, a flexible body portion and an outer reinforcing covering therefor of snugly fitting wire helically wound thereon, adjacent coils lying close together, and each coil having a covering of waterproof textile fabric.

9. In a steam hose, a flexible body portion and an outer covering therefor of helically wound wire fitting snugly thereto, adjacent coils at each end of said hose lying close together, and each coil having a covering of textile fabric, fittings for said hose at each end thereof extending within said hose and bands for securing said hose on said fittings, the ends of said wire extending under and being held by said bands.

In witness whereof, I have hereunto signed my name in the presence of two subscribing witnesses.

EDWARD E. GOLD.

Witnesses:
HENRY M. TURK,
FRED WHITE.